United States Patent [19]

Simons

[11] 4,338,835

[45] Jul. 13, 1982

[54] RECESSED HEAD FASTENER AND DRIVER THEREFOR

[76] Inventor: Leon Simons, 303 E. 57th St., New York, N.Y. 10022

[21] Appl. No.: 114,802

[22] Filed: Jan. 24, 1980

[51] Int. Cl.³ .............................................. B25B 13/48
[52] U.S. Cl. ..................................................... 81/436
[58] Field of Search ............................... 81/436; 85/45

[56] References Cited

U.S. PATENT DOCUMENTS 3,213,719 10/1965 Kloack .................................. 81/436
3,498,173 3/1970 Wright ................................... 81/436

FOREIGN PATENT DOCUMENTS 2608892 8/1977 Fed. Rep. of Germany .......... 85/45

Primary Examiner—James L. Jones, Jr.
Attorney, Agent, or Firm—Blum, Kaplan, Friedman, Silberman and Beran

[57] ABSTRACT

A fastener, such as a screw or bolt, has a recessed head for receiving a driver therein. Four arcs intersect, providing a squarish opening to the recess, which has circularly concave walls descending from the arcs to the base of the recess. The driver comprises a shaft having a somewhat spherical head in profile. Four arcs intersect to form the external surfaces and a squarish cross-section for the head. The recessed arcs are not concentric with the head arcs when the fastener and driver are mated, and the arc radii of the recess exceed the corresponding arc radii of the mated head. Transmission of force between driver and fastener is efficient even when the driver is tilted relative to the fastener axis.

8 Claims, 9 Drawing Figures

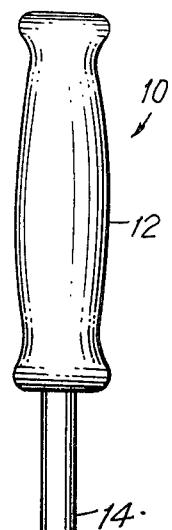
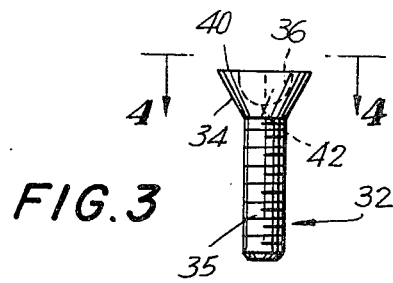
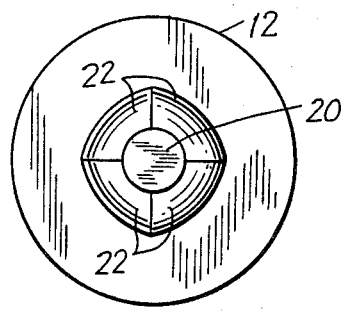
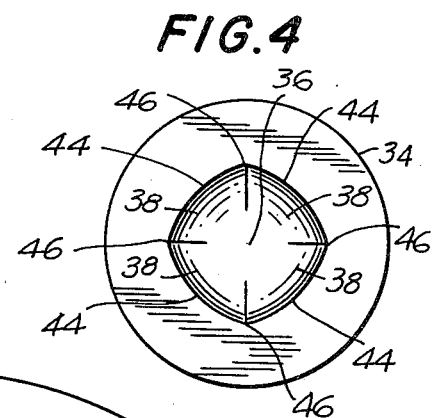
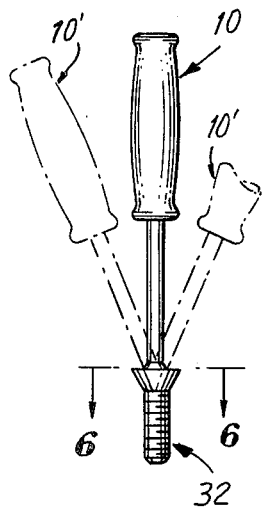
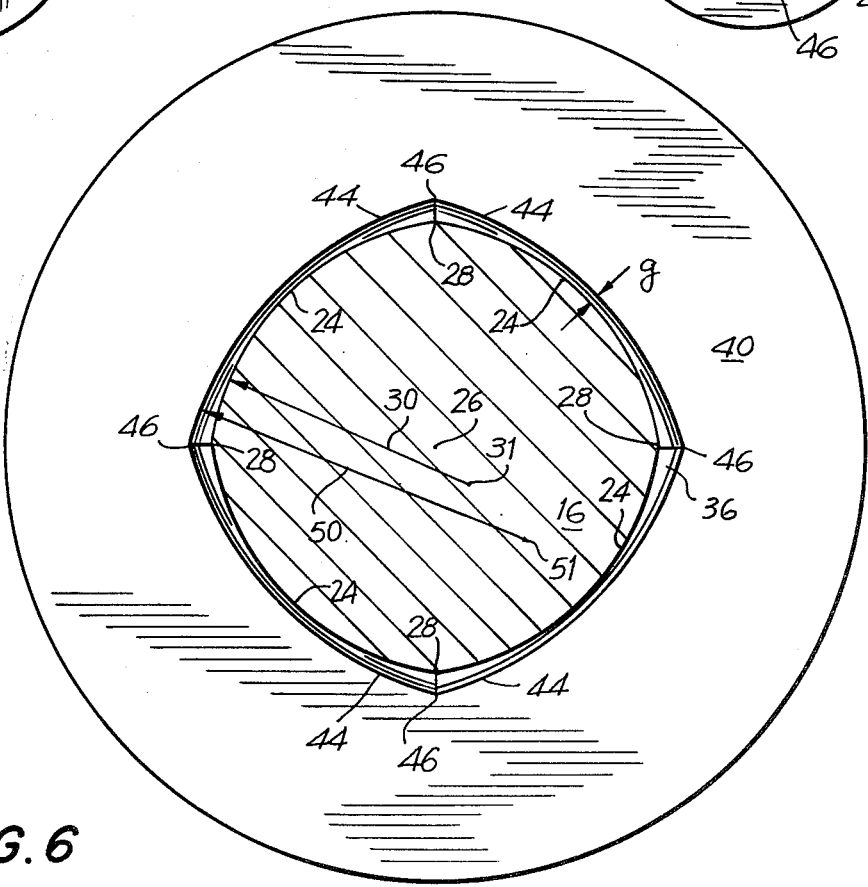

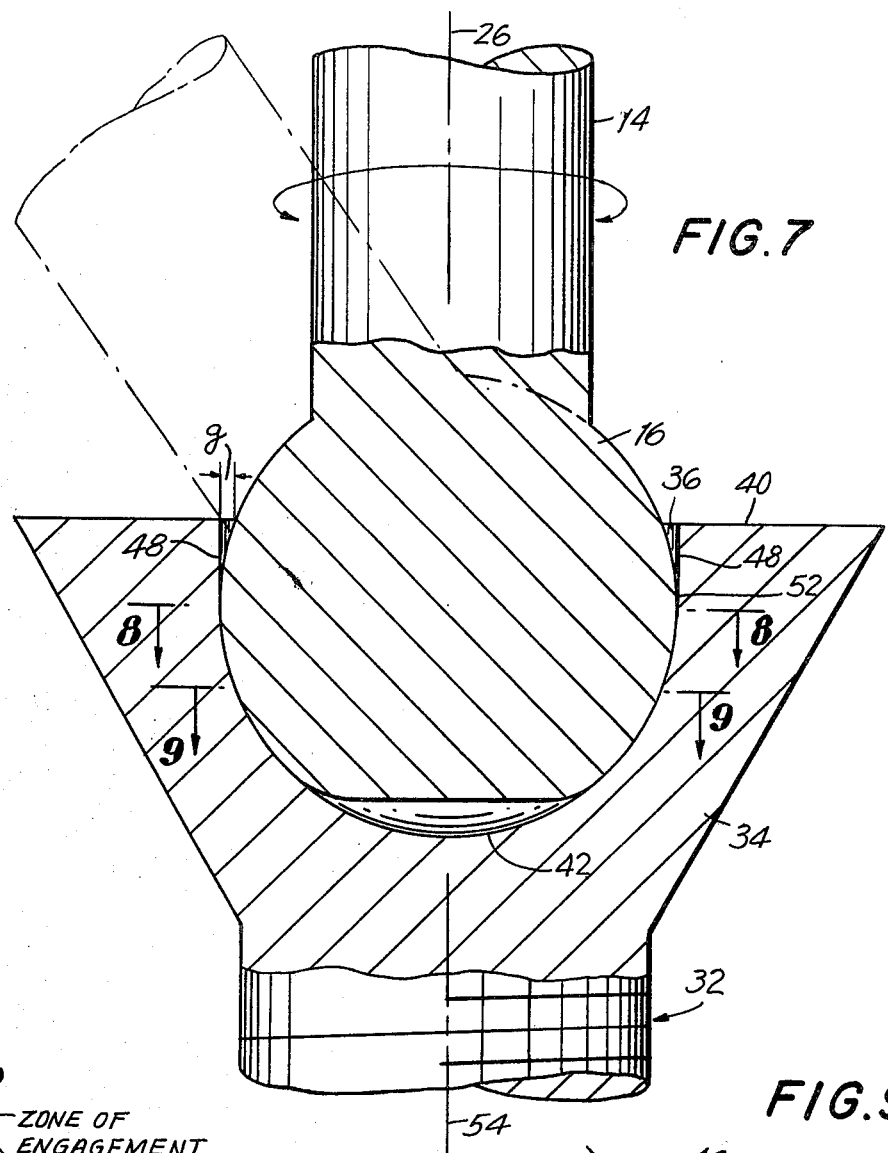
FIG. 7
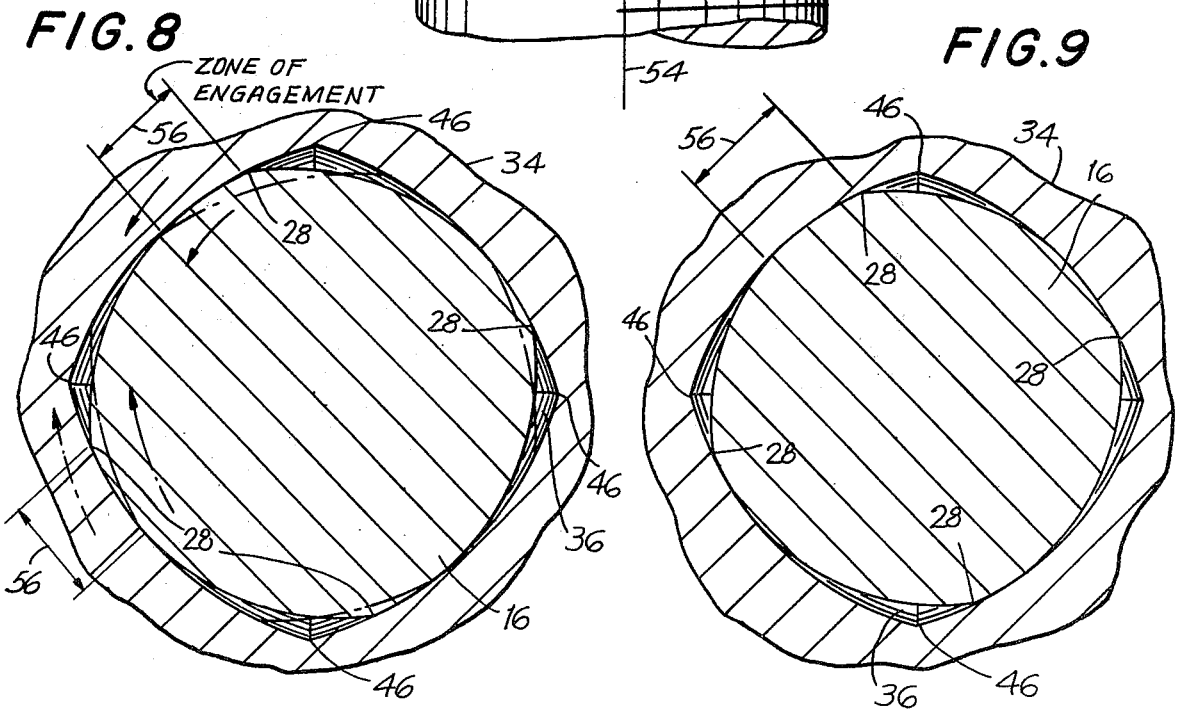
FIG. 8
FIG. 9

RECESSED HEAD FASTENER AND DRIVER THEREFOR

BACKGROUND OF THE INVENTION

This invention relates generally to a fastener and a driver therefor and more particularly to a fastener such as a screw or bolt having a recessed head to receive the driver therein. The head of a conventional slotted fastener is easily damaged by the conventional driver. Also, in fasteners of the Phillips type having recessed heads, the internal flutes are easily damaged when the driver is ill-fitting or turned with excessive force. Further, the driver tends to rise out of the recess or "cam out" when high force is required to turn the fastener and when the driver is not coaxially aligned with the recess of the screw. Neither type of fastener is conveniently driven when the axis of the driver is not collinear with the axis of the fastener. This makes it difficult to drive the fasteners in relatively inaccessible locations where direct in-line driving is not possible. Offset drivers, ratchets and flexible drive shafts are frequently resorted to to alleviate the difficulties presented by misalignment in the axes of the fastener and driver.

What is needed is a fastener and a compatible driver which are simple in nature and allow for efficient driving of the fastener from a misaligned position. It is also desirable that engagement between the fastener and driver is easily maintained during driving and the fastener is not damaged. Premature wearing out of the driver due to slippage and "camming out" is quite costly in production due to downtime as well as replacement of drivers.

It has been found in the manufacture of screws which incorporate head recesses made up of intersecting planes, such as in the Phillips type or slotted or hexagonal recesses, that there is great difficulty encountered in plating into the recesses.

It is therefore desirable to have a recess with smooth-flowing walls into which electroplating can penetrate.

SUMMARY OF THE INVENTION

Generally speaking, in accordance with the invention, a fastener with a recessed head and a companion driver especially suitable for driving in a misaligned condition are provided. The fastener according to this invention, such as a screw or bolt, has a recessed head for receiving a driver therein. Four arcs intersect, providing a squarish opening to the recess, which has circularly concave walls descending from the arcs to the base of the recess. The companion driver comprises a shaft having a somewhat spherical head, as seen in profile. Four arcs intersect to form the external surfaces and a squarish cross-section for the head. The recessed arcs are not concentric with the head arcs when the fastener and driver are mated, and the arc radii of the recess exceed the corresponding arc radii of the mated head. Transmission of force between driver and fastener is efficient even when the driver is tilted relative to the fastener axis. Rotation of the driver in the recess or socket provides extended surfaces of contact between driver and fastener which prevent damage to the fastener and driver.

Accordingly, it is an object of this invention to provide an improved fastener and companion driver which is efficiently driven without damage to the fastener and driver.

Another object of this invention is to provide an improved fastener and companion driver which permits efficient driving when the driver is misaligned from the fastener axis.

A further object of this invention is to provide an improved fastener having a socket head and a companion driver which is readily engaged in the fastener head and allows for driving without unintended disengagement.

Still another object of this invention is to provide an improved fastener having a socket head and a companion driver wherein driving force is applied over extended surfaces in the socket, and linear and point contact are eliminated.

Still other objects and advantages of the invention will in part be obvious and will in part be apparent from the specification.

The invention accordingly comprises the features of construction, combination of elements and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in conjunction with the accompanying drawings, in which:

FIG. 1 is an elevational view of a driver in accordance with this invention;

FIG. 2 is an end view taken along line 2—2 of FIG. 1;

FIG. 3 is an elevational view of a fastener in accordance with this invention;

FIG. 4 is a top view of the fastener of FIG. 3 taken along line 4—4 of FIG. 3;

FIG. 5 shows the fastener of FIG. 3 mated with the driver of FIG. 1;

FIG. 6 is a sectional view to an enlarged scale taken along line 6—6 of FIG. 5;

FIG. 7 is an enlarged sectional view of the driver and fastener of FIGS. 1 and 3 in an engaged condition;

FIG. 8 is a sectional view taken along line 8—8 of FIG. 7; and

FIG. 9 is a view similar to FIG. 8, taken along line 9—9 of FIG. 7.

DESCRIPTION OF THE PREFERRED EMBODIMENTS

With reference to FIGS. 1 and 2, the driver 10 in accordance with this invention includes a handle 12 and a shaft 14 attached to said handle 12 and extending longitudinally therefrom. A driving head 16, fixedly attached to the extended end of the shaft 14, has a general appearance in elevation or profile (FIG. 1) of a sphere truncated at the surface 18 of attachment to the shaft 14 and at the tip 20. The driving head 16 is comprised of four curved convex surfaces 22, each surface 22 extending substantially continuously from the upper surface 18 to the tip surface 20 of the driving head 16. Except for the truncation provided by the tip surface 20, these four symmetrically arranged convex surfaces 22 would join and blend into a substantially spherical surface.

FIG. 6 is a cross-sectional view, transverse to the longitudinal axis 26 of the driver 10, of the driving head 16 taken at a position approximating the maximum lateral dimensions of the head 16. The surfaces 22 are formed of four arcs 24 symmetrically positioned about the longitudinal axis 26 and intersecting to form cusps 28. Thus, in cross section (FIG. 6), the head 16 presents a squarish appearance. At every transverse section (FIGS. 6, 8, 9) of the head 16 from the tip 20 to the surface 18 joined to the shaft 14, there is a similar squarish configuration formed of four arcs 24, albeit the arcs 24 have different radii 30 in each transverse section. Each arc 24 in the same transverse section has the same radius 30, and the length of the radius 30 at each section exceeds half of the linear distance between opposed cusps 28.

With reference to FIGS. 3 and 4, a flat-headed machine screw 32 in accordance with this invention includes a head 34 having a recess or socket 36 formed therein and an integral body 35. The socket 36 is comprised of four concave curved surfaces 38 which extend from the flat face 40 of the screwhead 34 and blend into a generally spherical surface 42 at the base of the socket 36. As best seen in the top views (FIGS. 4, 6), the opening of the socket 36 is formed by four symmetrically positioned arcs 44 intersecting to form cusps 46. Accordingly, the opening to the socket 36 has a squarish shape similar to the cross-sectional contours of the driver head 16. As shown in the sectional view of FIG. 7, the socket has substantially vertical surfaces 48 adjacent to the face 40. The radius 50 of the arcs 44 at the surface 40 of the screwhead 34 is larger than the radius 30 of the driving head 16 at the maximum head section, transverse to the longitudinal axis 26. The arcs 24, 44 have different origins 31, 51, neither origin being coincident with the longitudinal axis 26.

Accordingly, as seen in FIG. 7, the driver head 16 easily enters within the opening of the socket 36 on the screw surface 40 when the cusps 28, 46 are in substantial alignment. The head 16 recesses in the socket 36 until the convex surfaces 22 of the driver 10 are in contact with the concave surfaces 38 of the socket 36. The vertical surfaces 48 allow the driver head 16 to enter the socket 36 behind the point of maximum cross-section of the head 16. There are clearances g between the driver head 16 and the screwhead 34 beginning at the face 40 and extending down the vertical walls 48 of the socket 36 to the lines of contact 52. These clearances g are larger near the cusps 28, 46 than at the arc midpoints. The generally spherical contours in profile of the driver head 16, the vertical walls 48 and the clearances g allow for tilting of the longitudinal axis 26 of the driver 10 relative to the longitudinal axis 54 of the screw 32 in a range of 20 to 30 degrees without interference between the driver 10 and the screwhead 34 while the driver head 16 remains engaged in the socket 36.

FIG. 6 illustrates a condition with the driver head 16 seated in the socket 36 in an undriven symmetrical relationship such that the gap g exists between all arcuate surfaces 24, 44, and the driver cusps 28 are positioned substantially adjacent to the socket cusps 46. When a rotating force is applied to the handle 12 of the driver 10, the driver head 16 rotates slightly within the socket 36, producing a zone of engagement 56 wherein portions of the outer surfaces 24 of the driver head 16 are wedged into forced contact with portions of the surfaces 44 forming the walls of the socket 36. The zones of surface engagement 56, beginning substantially at the cusps 28 of the driver head 16, extend in the direction of driver rotation. In FIG. 8, the solid lines of the head 16 indicate the engaged position when a counterclockwise force is applied to the driver 10 and screw 32. The broken lines indicate the position of the head 16 in the socket 36 when a clockwise force is applied. The driving force transmitted to the screw 32 is applied by the same wedging action which produces similar zones of surface engagement regardless of the direction of driver rotation. The extended zones of surface engagement 56, as compared to engagement at discrete points or along lines, reduces localized stresses on the socket wall and driver head surfaces 22, 38. Therefore, neither the driver 10 nor the screw 32 is easily damaged, regardless of the magnitude of applied force. It should be noted that the wedging action produced by the structures in accordance with this invention provides for an increasingly more positive engagement between the driver 10 and the screw 32 as greater and greater force is applied. As illustrated in FIGS. 8 and 9, the zones of engagement 56 extend downwardly through all transverse cross-sections of the driver head 16 with substantially the same proportion of the arcs 24, 44 being in engagement at each level of the socket 36. The surface zones of engagement 56 are substantially maintained even when the driver 10 is tilted in the socket 36 because of the generally spherical profiles of the driver head 16 and socket 36. Force is transmitted effectively without the head 16 lifting from the socket 36.

In the embodiment described above, the arcs 24, 44 are circular segments. However, in an alternative embodiment of this invention, the curvature between the cusps need not be circular, and each arc may include a plurality of radii so long as the arcs of the driver head and socket are of similar contour. Thus, a zone of surface engagement rather than point or linear contact is assured, and the engagement zone may be enlarged or reduced by adjustment in these curvatures.

It should be understood that in alternative embodiments of this invention, the number of arc segments need not be four, as illustrated in the Figures, but greater or lesser numbers may be employed.

Further, it should readily be understood that applications of the driver and socket according to this invention are not limited to flat-headed machine screws as illustrated but are equally applicable to all types of screw fasteners, including, for example, round head, fillister head, and fasteners suited for use, for example, with metal, plastic, wood.

Also in an alternative embodiment of this invention, the driver head may be cylindrical rather than generally spherical in elevational profile. Driving action is similar to that described in the above embodiment, but tilting of the driver in the socket is not achieved.

It will thus be seen that the objects set forth above, and those made apparent from the preceding description, are efficiently attained, and since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. The combination of a fastener requiring a driver and a companion driver therefor, comprising:
   a fastener body;
   a fastener head attached to said fastener body, said fastener head having a socket recessed therein, the walls of said socket being a plurality of curved surfaces intersecting to form a plurality of cusps, said curved surfaces being symmetrically distributed about the longitudinal axis of said fastener;

a driver shaft;

means for engaging and rotating said driver shaft;

a driver head attached to said driver shaft for rotation therewith and having a plurality of curved surfaces thereon, said surfaces intersecting to form a plurality of cusps, the number of cusps and curved surfaces on said driver head equaling the number of cusps and curved surfaces in said fastener socket, said curved surfaces of said driver head being symmetrically distributed about a longitudinal axis of said driver, said curved surfaces of said driver head and socket including circular arcs, the radii of said driver head arcs being less than the radii of said fastener arcs, the radii of said socket arcs exceeding the linear distance between said socket arcs and said fastener axis, and the radii of said driver head arcs exceeding the linear distance between said driver head arcs said driver axis, the origins of said head and socket arcs lying in cross-sections of said head and socket respectively, said cross-sections being transverse to said longitudinal axes, said head arcs being non-concentric with said fastener arcs when said driver head seats within said fastener socket, rotating said driver head within said socket producing areas of engagement between said curved surfaces of said head and fastener.

2. The combination of a fastener requiring a driver and a companion driver therefor, comprising:

a fastener body;

a fastener head attached to said fastener body, said fastener head having a socket recessed therein, the walls of said socket being a plurality of curved surfaces intersecting to form a plurality of cusps, said curved surfaces being symmetrically distributed about the longitudinal axis of said fastener;

a driver shaft;

means for engaging and rotating said driver shaft;

a driver head attached to said driver shaft for rotation therewith and having a plurality of curved surfaces thereon, said surfaces intersecting to form a plurality of cusps, the number of cusps on said driver head equaling the number of cusps in said fastener socket, said curved surfaces of said driver head being symmetrically distributed about a longitudinal axis of said driver, the radii of curvatures of a portion of said driver head arcs being less than the radii of curvatures of said fastener arcs, the radii of said socket arcs exceeding the linear lateral distance between said socket arcs and said fastener axis, and the radii of said portion of driver head arcs exceeding the linear lateral distance between said portion of driver head arcs and said driver axis, the origin of said portion of head arcs and said socket arcs lying in cross-sections of said head and socket respectively, said cross-sections being transverse to said longitudinal axes, said portion of head arcs being non-concentric with said fastener arcs when said driver head seats within said fastener socket, rotating said driver head within said socket producing areas of engagement between said curved surfaces of said head and fastener.

3. A combination as claimed in claim 1 or 2, wherein said curved socket wall surfaces are concave and said driver head curved surfaces are convex.

4. A combination as claimed in claim 3, wherein said curved socket wall surfaces are substantially parallel to said fastener axis adjacent to the opening of said socket.

5. A combination as claimed in claim 4, wherein said curved surfaces of said driver head extend from said shaft in generally spherical contours.

6. A combination as claimed in claim 5, wherein the depth and contours of said socket are adapted to receive said driver head such that the maximum lateral dimension of said generally spherical driver contours is positioned within said socket when said driver and fastener are engaged.

7. A combination as claimed in claim 1, wherein the number of curved surfaces of said socket is four, and the socket and driver head are squarish in cross section.

8. A combination as claimed in claim 1 or 2, wherein said fastener is a screw-type fastener.

* * * * *